Patented Feb. 27, 1923.

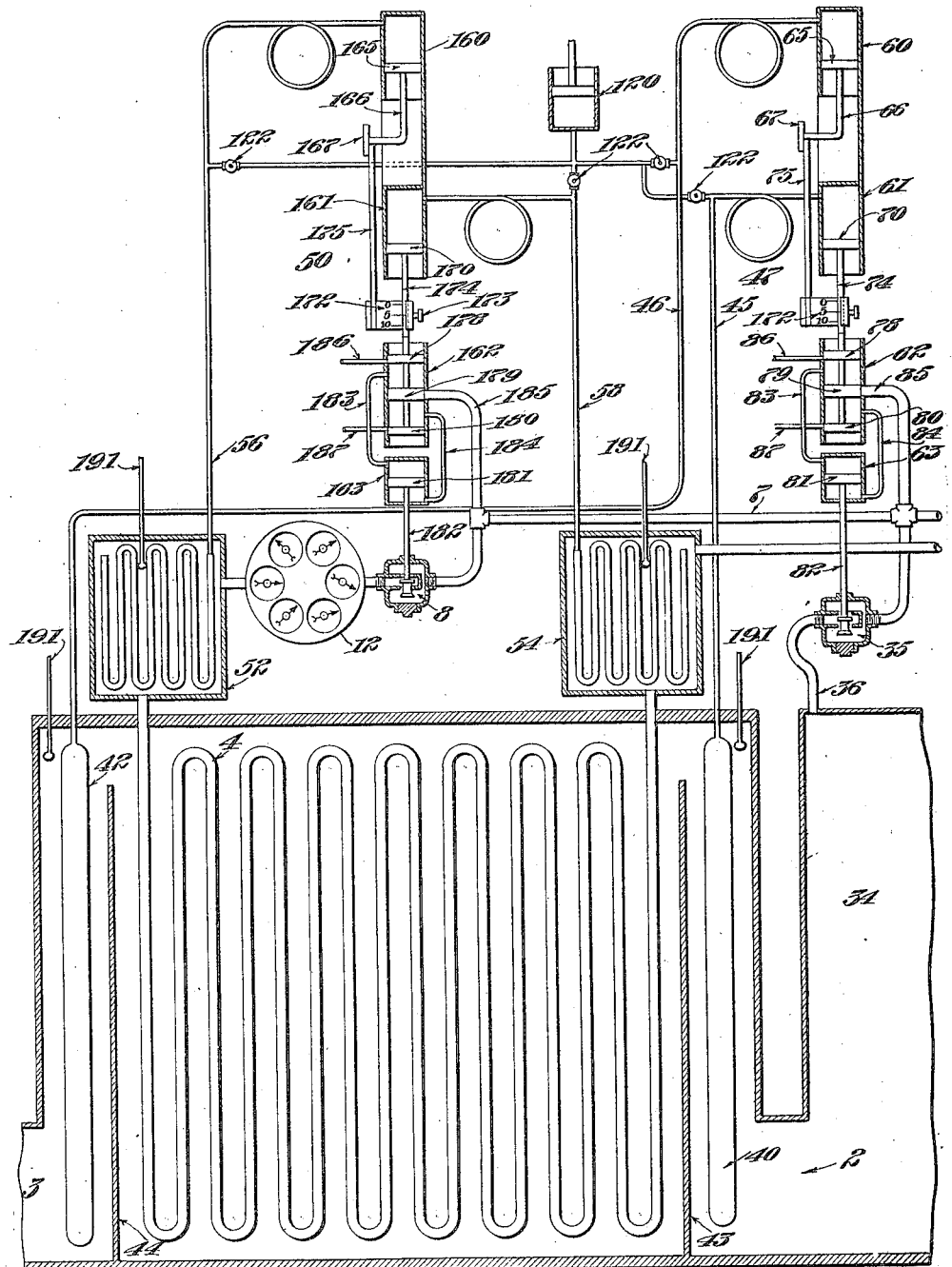

1,446,461

UNITED STATES PATENT OFFICE.

CHARLES W. HINMAN, OF WINCHESTER, MASSACHUSETTS; NATHANIEL C. NASH, JR., EXECUTOR OF SAID CHARLES W. HINMAN, DECEASED.

METHOD OF AND APPARATUS FOR MEASURING GAS.

Application filed June 15, 1921. Serial No. 477,844.

*To all whom it may concern:*

Be it known that I, CHARLES W. HINMAN, a citizen of the United States, residing at Winchester, in the county of Middlesex and State of Massachusetts, have invented certain new and useful Improvements in Methods of and Apparatus for Measuring Gas; and I do hereby declare the following to be a full, clear, and exact description of the invention, such as will enable others skilled in the art to which it appertains to make and use the same.

This invention relates to a method of and apparatus for measuring the flow of a gas. The invention is particularly adapted for measuring the flow of illuminating gas at stations where it is manufactured in large quantities for municipal or industrial use such as at city gas plants.

The object of the present invention is to provide a novel and improved method of measuring the flow of a gas, and further to provide an improved construction of apparatus for measuring the gas flow according to the present method.

It has heretofore been proposed to measure the flow of a gas by the abstraction of heat from the gas by means of a current of liquid during the passing of the gas through a chamber. The incoming and outgoing fluid liquid and gas were both maintained at a constant and invariable temperature so that the flow of the liquid was a direct measure of the flow of the gas. The present method, however, differs from the foregoing method in that the incoming and outgoing gas and fluid are not maintained at constant and invariable temperatures but, on the contrary, while the individual gas and fluid temperatures may vary yet a constant temperature difference is maintained between the incoming and outgoing fluid and also between the incoming and outgoing gas. It is not necessary that these temperature differences should be identical.

The invention therefore consists in the method and apparatus hereinafter described and claimed.

The principle underlying the present method of measuring the flow of a gas depends upon the fact that, assuming the contact chamber to be well insulated, the heat given up by the gas equals the heat gained by the water. Assuming A to be the weight of gas, B its specific heat, C the temperature difference between the gas at the inlet and outlet of the contact chamber, D the weight of the water or other fluid, E its specific heat, and F the temperature difference between the water at the inlet and outlet of the chamber, then $$ABC = DEF$$

or $$A = \frac{DEF}{BC}$$

D is determined by reading the water meter, B and E, the specific heats, being known, and the temperature differences C and F, are, according to the present method and by the present apparatus, each automatically maintained at a predetermined amount, it therefore follows that the gas flow is directly proportional to the flow of the water.

In the accompanying drawings, illustrating the preferred embodiment of the invention, the apparatus for measuring the gas flow according to the present method, and by which the predetermined temperature differences between the gas and water respectively at the inlet and outlet of the contact chamber are automatically maintained constant, is shown diagrammatically.

Referring to the drawings, the contact chamber 1 is provided with a gas inlet 2 and a gas outlet 3. The heat extracting liquid, preferably water, is caused to flow through a pipe 4 within the contact chamber 1 and in a direction counter-current to the flow of the gas. The pipe 4 is or may be formed in coils of sufficient number to insure that the temperature differences of gas and water are constant at any and all rates of flow of gas. Water is supplied to the pipe 4 from a supply pipe 7, the flow being controlled by a valve 8 preferably of the well-known balanced type. The flow of the water is measured by a water meter 12 of any usual or preferred construction. The gas before entering the contact chamber 1 through the gas inlet 2, is caused to pass through a cooling chamber 34 which may comprise a multi-tubular condenser of the ordinary construction. Water is supplied to the cooling chamber 34 through a pipe 36 the flow being controlled by a balanced valve 35, of ordinary or preferred construction.

Provision is made for automatically maintaining a constant temperature difference between the temperature of the gas at the inlet and outlet of the contact chamber. For this purpose thermostats 40, 42 of equal volume are located in the contact chamber at the inlet and outlet ends thereof respectively. Baffle plates 43, 44 are provided to deflect the gas in a direction lengthwise of the thermostats. The thermostats 40, 42 are provided with pipes 45, 46 connecting the thermostats with mechanism indicated by the general reference 47 for actuating the water valve 35 controlling the flow of water to the cooling chamber 34.

The flow of water through the supply pipe 7 and the coils 4 within the contact chamber is controlled by mechanism indicated by the general reference 50 for actuating the water valve 8. The water entering and leaving the coil pipe 4 within the contact chamber is caused to flow through thermostats 52, 54 of equal volume each operatively connected by pipes 56, 58 to the mechanism 50.

The mechanisms 47 and 50 are similar in construction. The mechanism 47 comprises four cylinders 60, 61, 62, 63 arranged one above the other, as shown in the drawing. The upper cylinders 60, 61 are rigidly connected together, being guided in suitable supports (not shown) so as to be free to move vertically. The upper cylinders 60 and 61 are closed at their upper ends and are open at their lower ends. A piston 65 slides within the cylinder 60 and is rigidly supported in a stationary position by a connector 66 secured to a fixed bracket 67. A piston 70 slides within the cylinder 61 and is provided with a depending stem 74. The cylinder 62 is open at both ends and three pistons 78, 79 and 80 slide within the cylinder 62 and are themselves secured upon the depending stem 74 to move therewith. The lower cylinder 63 is closed at both ends, and a piston 81 sliding within the cylinder is provided with a stem 82 carrying upon its lower end the movable portion of the valve 35 so that movements of the piston 81 operate to directly control the flow of water from the supply pipe 7 through the pipe 36 to the cooling chamber 34. The cylinders 62 and 63 are connected by by-passes 83 and 84 arranged as shown, the by-pass 83 leading to the top of the cylinder 63 above the piston 81 and the by-pass 84 leading to below the piston 81. The water inlet 85 leading to the cylinder 62 is controlled by the piston 79 and the water outlets 86 and 87 are controlled by the pistons 78 and 80. The mechanism indicated by the general reference 50 for controlling the actuation of the water valve 8 is of the same construction as the mechanism 47 just described and includes cylinders 160, 161, 162 and 163 having the pistons 165, 170, 178, 179, 180 and 181 connected in a similar manner by the parts 166, 167, 175, 174 and 182 to the movable portion of the water valve 8. The cylinders 162 and 163 are connected in exactly the same manner by by-passes 183, 184, and the cylinder 162 is provided with the water inlet 185 and the water outlets 186 and 187.

From the foregoing description of the construction of the mechanisms 47 and 50 it will be apparent that because the cylinders 60, 61 and 160 and 161 are capable of movement with relation to their pistons that when the temperatures at the inlet and outlet of the contact chamber rise equally so as to maintain a constant difference in temperature between the gas at these two points, the fluid within the thermostats 40 and 42 expands equally and causes merely the raising of the cylinders 60, 61 without causing a depression of the piston 70 and water controlling valve 79 which moves therewith. Similarly, if the difference in temperature between the inlet and outlet water flowing through the coil pipe 4 within the contact chamber remains constant, or in other words if the temperatures at the thermostats 52 and 54 rise equally, expansion of the fluid within the thermostats 52 and 54 operates merely to cause the cylinders 160 and 161 to rise with relation to their pistons without causing a depression of the piston 170 and piston 179, which controls the water flow from the pipe 185 and is normally moved with the piston 170. It is only when this difference in temperature between either the inlet and outlet water flowing through the pipe 4 or between the inlet and outlet gas flowing through the contact chamber varies from a constant that movement of the pistons 70 and 170 occurs so as to alter the flow of water through the valves 35 and 8 respectively.

The operation of the apparatus may be described as follows: Assuming that the temperature differences between the gas at the inlet and outlet of the contact chamber and the water at the same points are maintained constant, the flow of the gas through the contact chamber is directly proportional to the flow of the water so that calibration of the water meter 12 enables the flow of the gas to be read directly in units of volume, as for example in cubic feet. As the rate of flow of the gas through the contact chamber increases or decreases the rate of flow of the water is proportionately increased or decreased in a manner as will be described, so that the reading of the water meter 12 affords a true measure of the quantity of gas flowing through the contact chamber.

Assuming that a gas has a specific heat of .0231 it is a fact that three gallons of water flowing through the water meter 12 raised 12 degrees are required to cool one thousand cubic feet of gas 13 degrees. Assuming that the gas from the purifiers in the ordinary manufacture of illuminating gas in the amount of one thousand cubic feet enters the cooling chamber 34 at a temperature of for example 90 degrees, it is cooled somewhat to say a temperature of 83 degrees, so that the temperature of the gas entering the contact chamber 1 is 83 degrees. Assuming that three gallons of water flowing through the water meter 12 enters through the thermostat 52 at 57 degrees and are caused to flow through the coil pipes in a direction counter current to the flow of the gas, and that the gas is cooled 13 degrees so that it leaves the contact chamber at a temperature of 70 degrees at the same time the water will be raised in temperature 12 degrees so that it leaves through the thermostat 34 at 69 degrees. The operation of the mechanisms 47 and 50 in maintaining a constant difference of temperature between the inlet and outlet water and the inlet and outlet gas may be best described by considering their operation when the temperature of the gas itself increases and then by considering their operation when the temperature of the water increases.

Assuming that the general conditions remain normal and that the temperature of the gas entering the cooling chamber is 95 degrees instead of 90, in passing through the cooling chamber the gas will be cooled a little more than under normal conditions because of the greater difference in temperature between the cooling water and the gas so that it enters the contact chamber at a temperature as for example 86 degrees. In passing the thermostats 40 the gas at the increased temperature causes the expansion of the thermostatic fluid, depressing the piston 70 within the cylinder 61, lowering the piston 79 within the cylinder 62, and permitting water to flow from the supply pipe 7 through the pipe 85 to within the cylinder 62 above the piston 79, thence through the by-pass 83 to the cylinder 63 above the piston 81 thus operating to depress the latter and to open the valve 35 to increase the flow of cooling water to the chamber 34. This permits the flow of sufficient additional water to the cooling chamber 34 to reduce the temperature of the gas passing therethrough so that as the gas enters the gas inlet 2, it has been cooled to its normal temperature of for example 83 degrees. During the cooling of the gas the thermostatic fluid within the thermostat 40 contracts to its original or normal temperature thus permitting the air pressure upon the bottom of the piston 70 to cause it to rise and to thereby shut off the flow of water from the pipe 85 by the piston 79. However, the gas before it has been cooled to normal, while passing through the contact chamber at a temperature of 86 degrees will cause the temperature of the water as it leaves the contact chamber and flows through the thermostat 54 to rise to say for example 72 degrees (the normal outlet temperature being 69 degrees). This increase in the temperature of the outlet water within the thermostat 54 operates to expand the fluid in the thermostat 54 thereby operating to depress the pistons 170 and 179, permitting the flow of water from the pipe 185 through the bypass 183 to above the piston 181 within the cylinder 163, thus depressing the valve 8 and permitting an increased flow of water through the coil pipe 4. The increased flow of water continues until the temperature of the water leaving the coil pipes 4 through the thermostat 54 has returned to a normal value of 69 degrees. During the reduction of the temperature of the water from 72 degrees to 69 degrees, the thermostatic fluid contracts to its original volume permitting the air pressure upon the underside of the piston 170 to cause the flow of water from the pipe 185 to be shut off by the piston 179. The foregoing cycle of operations takes place whenever the temperature of the gas increases. It is obvious that a reverse cycle of operations would take place should the temperature of the gas decrease below its normal value. In such an instance the thermostatic fluid within the thermostats 40 and 54 would contract permitting the air pressure upon the pistons 70 and 170 to cause the operation of the valves 35 and 8 to diminish the flow of water to the cooling chamber 34 and coil pipes 4 respectively. It will therefore be observed that in the event of either an increase or decrease in the gas temperature the mechanisms 47 and 50 operate in the foregoing manner to automatically maintain a constant difference in temperature between the inlet and outlet gas and water respectively.

Assuming that all conditions remain normal with the exception that the temperature of the water supply increases, as for example 5 degrees, so that instead of entering through the thermostat 52 to the coil pipes 4 at a temperature of 57 degrees it enters at a temperature of 62 degrees. In such an instance the thermostatic fluid within the thermostat 52 will expand, forcing up the movable cylinders 160 and 161 with relation to the fixed piston 165 and fixed support 167. The upward movement of the cylinder 160 draws up the piston 170 and also the piston 179 allowing water to enter beneath the piston 179 from the pipe 185 and thence to pass through the by-pass 184 to below the piston 181 and to thereby decrease the flow of water through the valve 8. In consequence of the decreased flow of water through the coil pipe 4 and also because of the increased temperature of the water, the outgoing water flowing through the thermostat 54 reaches a relatively high temperature, as for example 79 degrees. The increase in temperature (10 degrees) within the thermostat 54 operates through the expansion of the thermostatic fluid to depress the pistons 170 and 179 with relation to the cylinder 160 an amount twice as great as the increase in the temperature of the water, namely 5 degrees (from 57 degrees to 62 degrees) caused the cylinder 160 to rise. This depression of the piston 179 permits water to flow from the pipe 185 to the by-pass 183 to above the piston 181 thus operating to increase the rate of flow of water through the valve 8. The increased flow of water continues until the temperature within the thermostat 54 has dropped 5 degrees to approximately 74 degrees at which time the contraction of the thermostatic fluid will have permitted air pressure upon the underside of the piston 170 to return the parts to their normal position in which the water in the pipe 185 is cut off by the piston 179. The mechanism 50 therefore operates to maintain the temperature of the outgoing water at the thermostat 54 at 74 degrees. Meanwhile, however, the temperature of the outgoing gas in contact with the thermostat 42 within the contact chamber has increased from 70 degrees (its normal value) to 75 degrees. This increase in temperature forces up the cylinder 60 through the expansion of the thermostatic fluid within the thermostat 42. As the cylinder 60 rises it carries with it the pistons 70, 79, thus operating to lift the piston 81 and cut down the flow of water to the cooling chamber 34 by closing the valve 35. The decreased flow of water to the cooling chamber 34 operates to permit the temperature of the inlet gas to rise and as it rises the thermostatic fluid is caused to expand thus operating to depress the pistons 70 and 79 until the water supply from the pipe 85 has been cut off by the piston 79. The apparatus is adjusted so that the piston 79 is in a position to shut off the flow of water from the pipe 85 when the temperature of the inlet gas has reached 88 degrees, thus maintaining a difference in temperature between the inlet and outlet gas of 88 degrees—75 degrees, or 13 degrees. As above described, the cooling water entering the coil pipes 4 at a temperature of 62 degrees was automatically maintained by the mechanism 50 to an exit temperature of 74 degrees, thus maintaining a constant difference of 12 degrees between the inlet and outlet water. It will therefore be observed that in the event that the temperature of the water supply increases the apparatus automatically maintains a constant difference in temperature between both the inlet and outlet water and gas.

It is obvious that should the temperature of the supply of water decrease instead of increase, the foregoing cycle of operations will be reversed, the air pressure operating to cause upward movement of the pistons 160 and 170 upon the contraction of the thermostatic fluid within the pipes 56 and 58. The effect of the air pressure may if desired be supplemented by a counter weight or spring (not shown).

As the quantity of gas passing through the contact chamber increases or decreases, the temperature differences of the water and gas being as above described maintained constant, the apparatus will operate to automatically increase or decrease the flow of water through the coil pipes 4 and therefore through the water meter 12, so that the reading of the water meter 12 will be directly proportional to the quantity of gas passing through the contact chamber. If the flow of gas is thus increased the temperature of the outlet water passing through the thermostat 54 increases, because the same amount of water at the same temperature as before is used to cool an increased amount of gas the same number of degrees as before. The area of the surface of the coil pipes 4 is sufficiently great to insure sufficient transfer of heat from the gas to the water so that the valve 8 will be opened through the depression of the pistons 170 and 179 upon the expansion of the thermostatic fluid within the thermostat 54.

In order to adjust the relative position of the cylinders 60, 61, 160, 161, with their pistons 65, 70, 165, 170 respectively, provision is made for selectively introducing variable quantities of thermostatic fluid from a source of supply through a pump 120 connected to the pipes 45, 46, 56 and 58 respectively. Suitable valves 122 are provided for permitting the selective introduction of the thermostatic fluid from the pump 120 to any one of the cylinders.

Each of the mechanisms 47 and 50 is provided with an index 172 carried by a supporting rod 175 secured at its upper end to the fixed clamps 67 and 167 respectively. In this manner the indexes are maintained at a definite distance from the pistons 65 and 165 respectively. By reading the index with relation to the position of a mark upon the stems 74 and 174, the operator can ascertain whether the apparatus is at any time in its condition of initial adjustment. As the temperature of the water and gas rises and falls with the different seasons of the year the amount of fluid within each of the cylinders 60, 61, 160 and 161 may be varied by adding more fluid or removing fluid from the cylinders. By clamping the indexes by the set screws 173 to the stems 74 and 174 respectively both sets of pistons 60 and 70 and 160 and 170 are rigidly secured together so that the same amount of fluid may be conveniently added to or removed from the cylinders. Suitable thermometers 191 are provided in the inlet and outlets of the gas and water to enable the apparatus to be calibrated and brought to an initial adjustment.

While the preferred embodiment of the invention has been illustrated and described, it is to be understood that the same may be embodied in other forms within the scope of the following claims.

Having thus described the invention what is claimed is:

1. The method of measuring the flow of a gas which consists in abstracting heat from the gas by means of a current of fluid, measuring the flow of the fluid and maintaining constant differences between the temperature of the fluid before and after action upon the gas and between the temperature of the gas before and after action upon the fluid, said temperature differences being maintained irrespective of the individual temperatures of the fluid and gas before their action upon one another.

2. An apparatus for use in measuring the flow of a gas having, in combination, means for abstracting heat from a current of gas by a current of fluid, means for measuring the flow of the fluid and thermostatically operated mechanism for maintaining constant differences between the temperatures of the fluid before and after action upon the gas, and thermostatically operated mechanism for maintaining constant differences between the temperatures of the gas before and after action upon the fluid, said mechanisms having provisions for maintaining said temperature differences irrespective of the individual temperatures of the fluid and gas before their action upon one another.

3. An apparatus for use in measuring the flow of a gas having, in combination, a chamber through which the gas to be measured is passed, means for passing a confined current of fluid through the chamber to abstract heat from the gas, means for measuring the flow of the fluid, and thermostatically operated mechanisms for respectively maintaining constant differences between the temperatures of the fluid before and after action upon the gas and between the temperatures of the gas before and after action upon the fluid said mechanisms having provisions for maintaining said temperature differences irrespective of the individual temperatures of the fluid and gas before their action upon one another, said thermostatically operated mechanism including a pair of connected cylinders, pistons within the cylinders adapted to be moved in one direction under the influence of a thermostatic fluid, and means for selectively introducing varying quantities of thermostatic fluid to the cylinders to vary the position of the pistons with relation to the cylinders, said thermostatically operated mechanism having provision whereby one set of pistons are moved with relation to the cylinders only when the temperature differences between the fluid and gas before and after action upon one another vary from predetermined values.

4. An apparatus for use in measuring the flow of a gas having, in combination, a chamber through which the gas is to be passed, means for passing a confined current of fluid through the chamber to abstract heat from the gas, means for measuring the flow of the fluid, a fluid control chamber for pre-cooling the gas before its passage through the main chamber, valves controlling the flow of fluid to both chambers, and mechanisms for respectively maintaining constant differences between the temperatures of the fluid before and after action upon the gas and between the temperatures of the gas before and after action upon the fluid including thermostats arranged to be acted upon by the gas entering and leaving the chamber, thermostats arranged to be acted upon by the heat abstracting fluid as it enters and leaves the chamber, two sets of movable cylinders operatively connected with the gas and fluid thermostats, pistons within the cylinders, connections between one set of pistons and the fluid control valves, said cylinders being arranged to be moved with relation to said latter set of pistons only when the temperature differences between the fluid and gas before and after action upon one another vary from a predetermined value.

5. An apparatus for use in measuring the flow of a gas having, in combination, means for abstracting heat from a current of gas by a current of fluid, means for measuring the flow of the fluid, and mechanisms for respectively maintaining constant differences between the temperatures of the fluid before and after action upon the gas, and between the temperatures of the gas before and after action upon the fluid, said mechanisms having provisions for maintaining said temperature differences irrespective of the individual temperatures of the fluid and gas before their action upon one another.

CHARLES W. HINMAN.